(No Model.)  6 Sheets—Sheet 1.

J. R. WILLIAMS.
CIGAR MACHINE.

No. 346,627.  Patented Aug. 3, 1886.

WITNESSES:
Edward Wolff.
William B Ellison

INVENTOR
John R. Williams
BY
Chas. C. Gill
ATTORNEY (No Model.) 6 Sheets—Sheet 2.

J. R. WILLIAMS.
CIGAR MACHINE.

No. 346,627. Patented Aug. 3, 1886.

WITNESSES:
Edward Wolff.
William B. Ellison

INVENTOR
John R. Williams,
BY
Chas. C. Gill
ATTORNEY.

(No Model.)  6 Sheets—Sheet 3.

J. R. WILLIAMS.
CIGAR MACHINE.

No. 346,627. Patented Aug. 3, 1886.

WITNESSES:
Edward Wolff.
William B. Ellison

INVENTOR
John R. Williams,
BY Chas. C. Gill
ATTORNEY (No Model.)  6 Sheets—Sheet 4.

J. R. WILLIAMS.
CIGAR MACHINE.

No. 346,627.  Patented Aug. 3, 1886.

WITNESSES:
Edward Wolff
William D. Ellison

INVENTOR
John R. Williams
BY
Chas. C. Gill
ATTORNEY (No Model.) 6 Sheets—Sheet 5.
J. R. WILLIAMS.
CIGAR MACHINE.
No. 346,627. Patented Aug. 3, 1886.
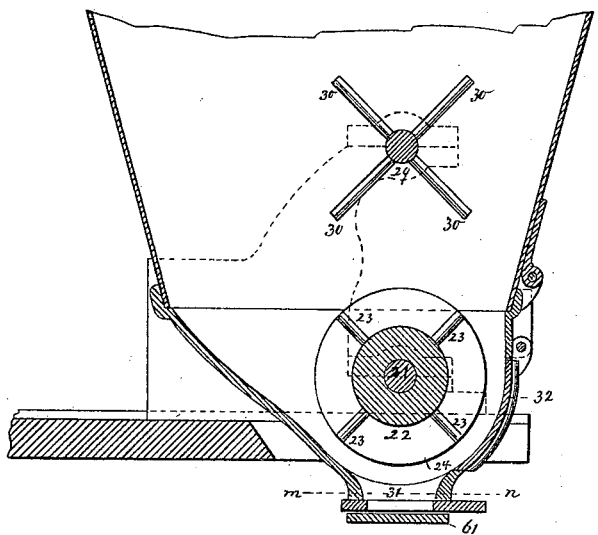
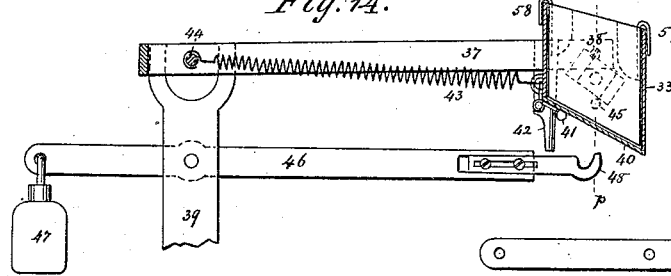
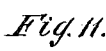
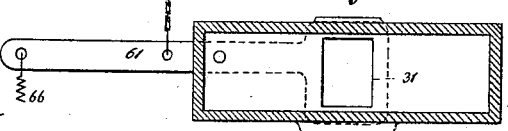
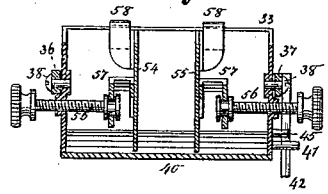
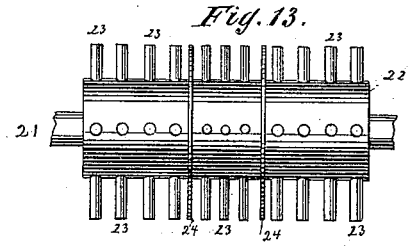
WITNESSES:
Edward Wolff
William D. Ellison
INVENTOR
John R. Williams
BY
Chas. C. Gill
ATTORNEY
N. PETERS, Photo-Lithographer, Washington, D. C.

(No Model.) 6 Sheets—Sheet 6.

J. R. WILLIAMS.
CIGAR MACHINE.

No. 346,627. Patented Aug. 3, 1886.

WITNESSES:
Edward Wolff
William B. Ellison

INVENTOR
John R. Williams
BY
Chas. C. Gill
ATTORNEY

N. PETERS, Photo-Lithographer, Washington, D. C.

UNITED STATES PATENT OFFICE.

JOHN R. WILLIAMS, OF NEWARK, NEW JERSEY.

CIGAR-MACHINE.

SPECIFICATION forming part of Letters Patent No. 346,627, dated August 3, 1886.

Application filed March 29, 1886. Serial No. 196,931. (No model.)

*To all whom it may concern:*

Be it known that I, JOHN R. WILLIAMS, a citizen of the United States, and a resident of Newark, in the county of Essex and State of New Jersey, have invented certain new and useful Improvements in Cigar-Machines, of which the following is a specification.

The invention relates to improvements in cigar-making machinery, and particularly to a machine for forming "cigar-bunches" preparatory to receiving the final wrapper.

The machine sought to be protected by the application of which this specification forms a part embodies a hopper for containing the loose tobacco to be used for the cigar-fillers and mechanism for subdividing the loose tobacco into successive uniform charges and feeding them to moving aprons by which the binder is applied, together with certain details of construction and combinations of parts, all as hereinafter particularly described, and pointed out in the claims.

Figure 1:
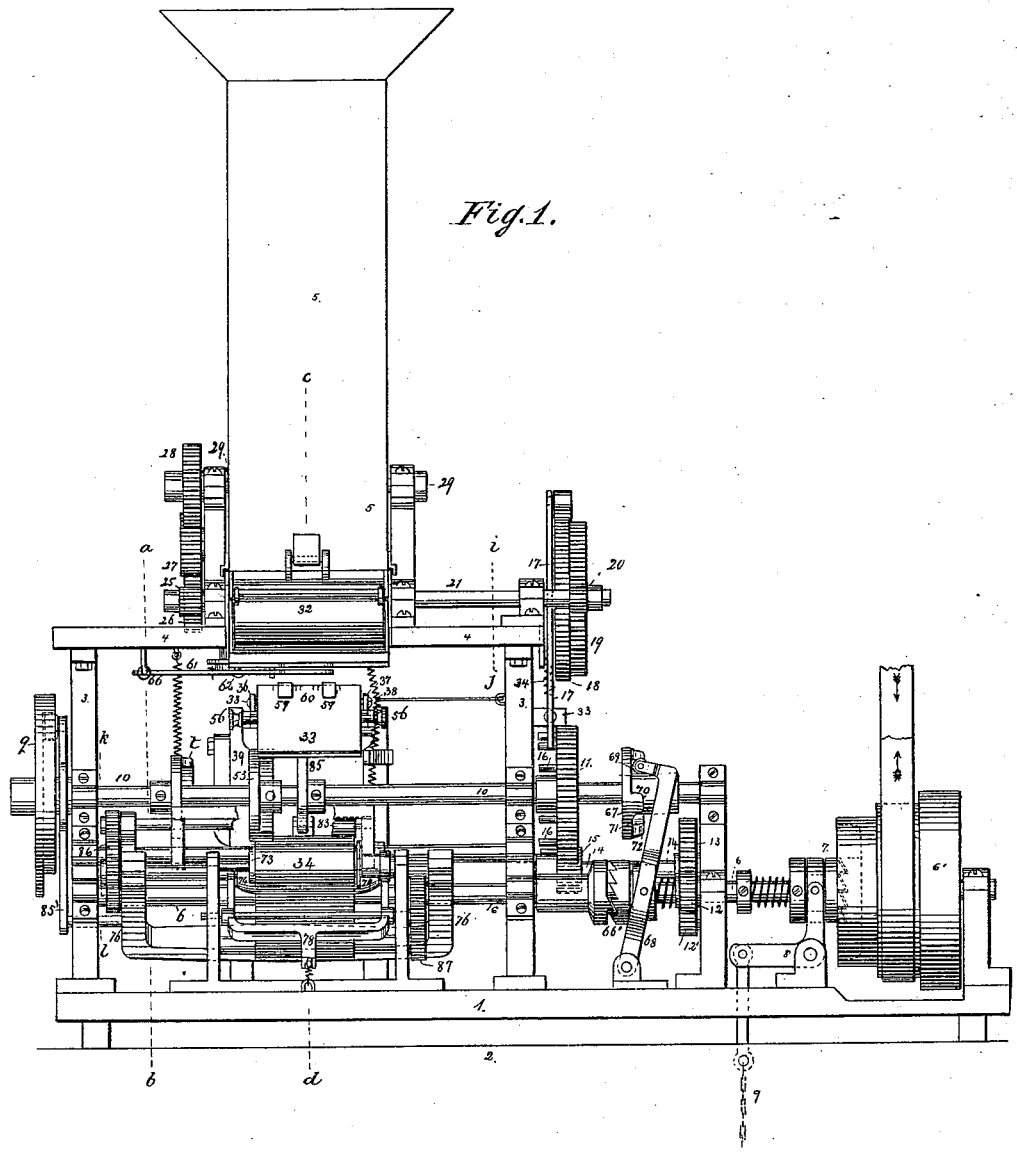
Figure 2:
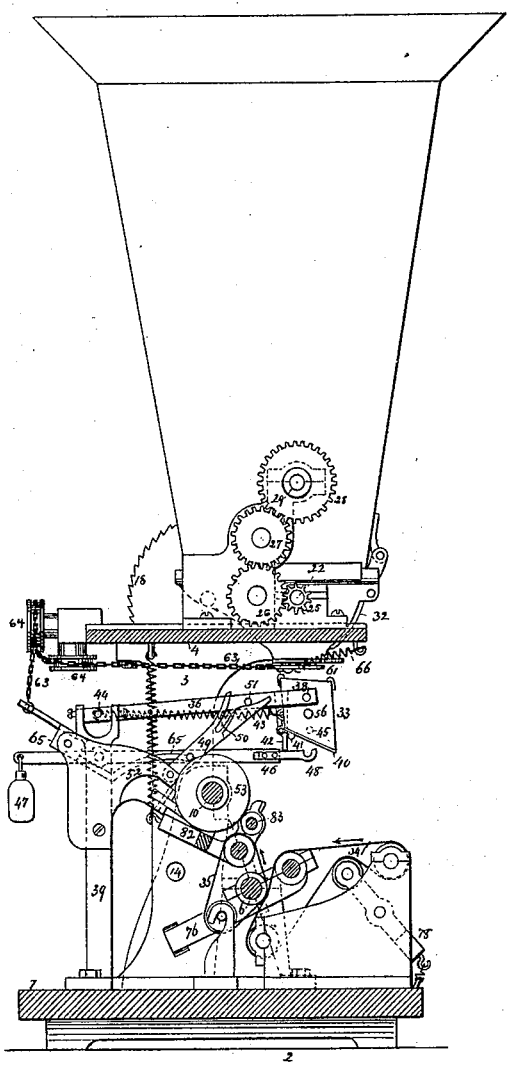
Figure 3:
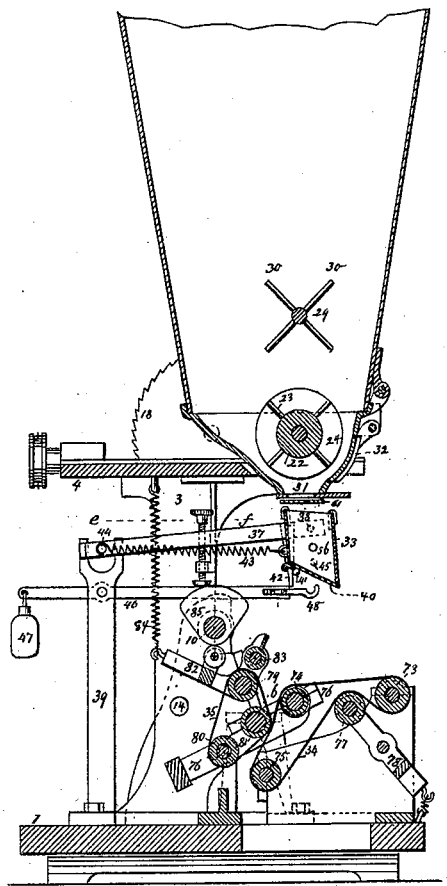
Figure 4:
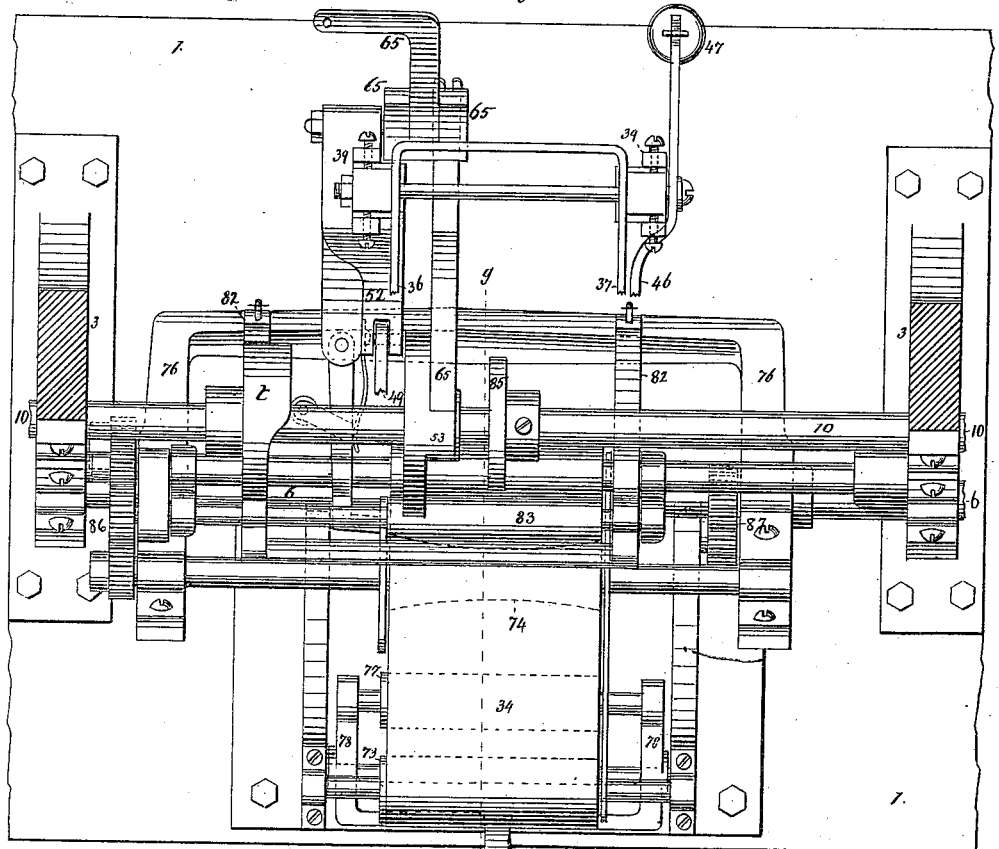
Figure 5:
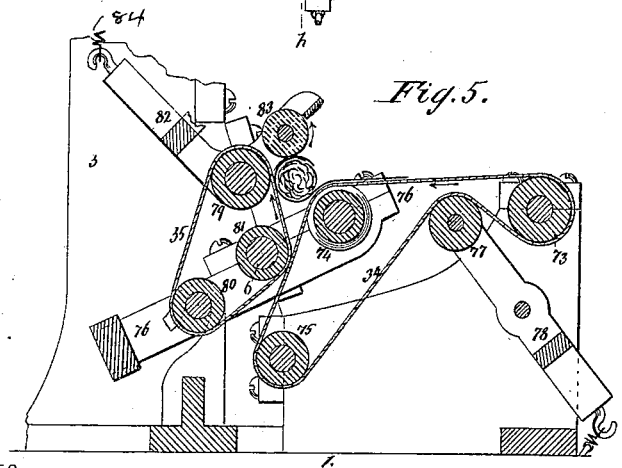
Figure 6:
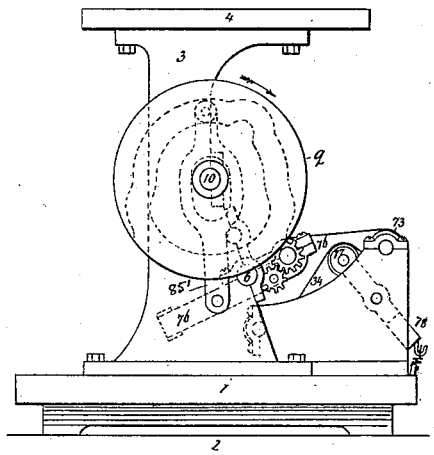
Figure 7:
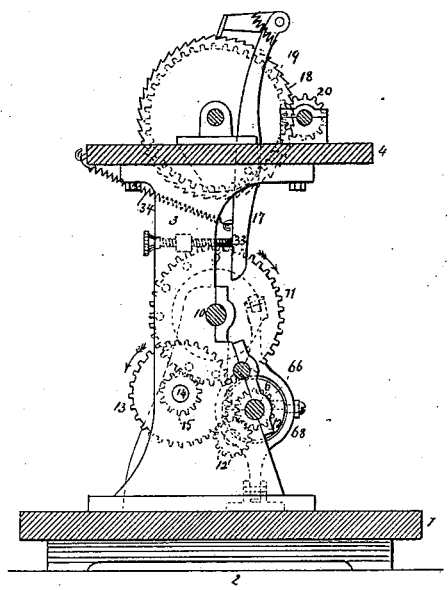
Figure 8:
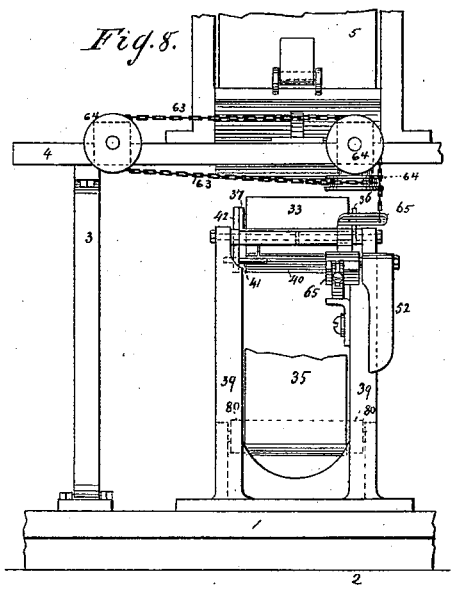
Figure 9:
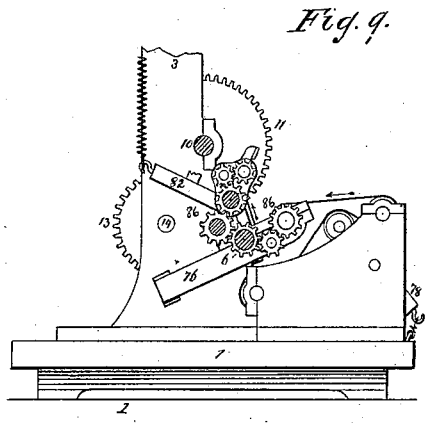
Figure 16:
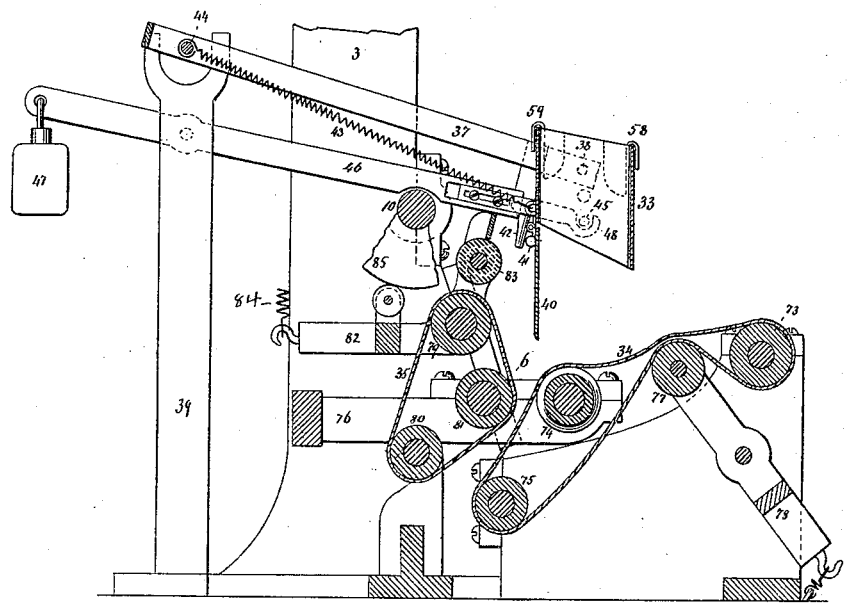
Figure 17:
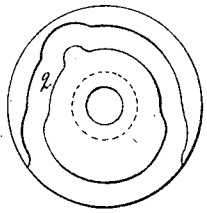
Figure 18:
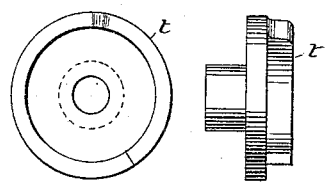
Figure 19:
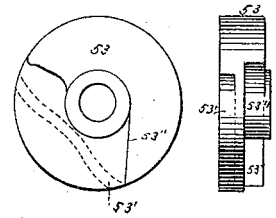
Figure 20:
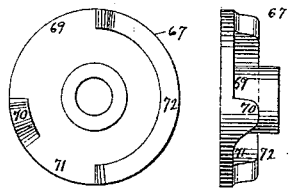

Referring to the accompanying drawings, forming a part of this application, Figure 1 is a front view of a machine embodying the elements of the invention. Fig. 2 is a vertical section of same on the dotted line $a\,b$ of Fig. 1, looking at the left-hand end of the machine. Fig. 3 is a vertical section on the dotted line $c\,d$ of Fig. 1. Fig. 4 is an enlarged horizontal transverse section looking downward on the dotted line $e\,f$ of Fig. 3. Fig. 5 is a central vertical section of the lower part of the machine, taken on the dotted line $g\,h$ of Fig. 4. Fig. 6 is a view of the lower part of the machine, looking at the left-hand end thereof. Fig. 7 is a vertical section on the dotted line $i\,j$ of Fig. 1, looking toward the right and showing the mechanism for actuating the agitators within the hopper. Fig. 8 is a detached view of the central part of the machine, looking at the back thereof. Fig. 9 is a vertical section on the dotted line $k\,l$ of Fig. 1. Fig. 10 is an enlarged vertical section of the lower end of the hopper and rotating shafts contained therein. Fig. 11 is a horizontal section on the dotted line $m\,n$ of Fig. 10. Fig. 12 is a plan view of a valve-plate employed for closing and opening the discharge-mouth at the lower end of the hopper at the proper time. Fig. 13 is a plan view of the rotating shaft carrying radial arms located over the discharge-mouth at the lower end of the hopper. Fig. 14 is a vertical section of the receptacle whereby the charges of tobacco from the hopper are successively conveyed to the rolling-aprons, the receptacle being shown in its upward position below the above-mentioned discharge-mouth and connected with supporting and operating mechanism. Fig. 15 is a vertical transverse section of said receptacle on the dotted line $o\,p$ of Fig. 14. Fig. 16 is a similar view to Fig. 5, with the exception that the rolling-belts are loose on their shafts and the tobacco-conveying-receptacle is shown in its downward position. Fig. 17 is a view of the inner face of the cam $q$, the outer face of which is shown in Fig. 6. Fig. 18 is a view of the face and edge of cam $t$, hereinafter referred to. Fig. 19 is a view of the inner face and edge of cam 53, hereinafter described; and Fig. 20 is a view of the face and edge of cam 67, mentioned hereinafter.

In the accompanying drawings, 1 denotes the base of the machine; 2, the table or support upon which it may rest; 3 3, vertical standards; 4, a supplemental plate supported upon the upper ends of said standards; and 5, a hopper secured at about the center of the supplemental plate 4, and adapted to contain the loose tobacco for the cigar-fillers.

The main driving-shaft of the machine is designated by the figure 6, and to the right-hand end of it is applied the loose belt-wheels 6', accompanied by the usual sliding clutch, 7, connected with the main shaft, and capable of being operated by means of the customary bell-crank lever, 8, one arm of the latter being connected by a chain, 9, with a foot-treadle, (not shown,) by which the attendant is enabled to utilize or dispense with the power for operating the driving-shaft.

Above the shaft 6 is an additional shaft, 10, suitably journaled, and carrying the gear-wheel 11, which derives motion from the main shaft through gear 12, intermediate wheel, 12', gear-wheel 13 on short shaft 14, and pinion 15, and said gear-wheel 11 has arranged at definite points on its inner face the series of horizontal pins 16, which during the rotation of the wheel come in contact with the lower end of the pivoted pawl 17, and thus operate said pawl to impart an intermittent rotary movement to the ratchet-wheel 18 and its rigidly-connected gear-wheel 19. The gear-wheel 19 engages the pinion 20 and communicates motion to it and its shaft 21, which passes transversely through the lower part of the hopper 5, and carries therein the rigidly-connected cylinder 22, upon which are the radial pins 23 and plates or disks 24. (Shown in Figs. 3, 10, and 13 of the drawings.)

Upon the left-hand end of shaft 21 is a pinion, 25, (see Figs. 1 and 2,) which meshes with the gear-wheel 26, engaging the intermediate gear-wheel, 27, the latter being in gear with the wheel 28, secured on the left-hand end of the transverse shaft 29, which passes through the hopper 5, and is provided with radial pins or agitators 30. (Shown in Figs. 3 and 10.) The purpose of the cylinder 22 and shaft 29, with their radial pins, is to keep the loose tobacco agitated and feed it into the discharge-mouth 31 of the hopper 5, and the said cylinder 22 and shaft 29 have an intermittent motion, owing to the fact that the pins 16 are only arranged along a portion of the gear-wheel 11, and that the ratchet-wheel 18 is only rotated during such time as the lower end of the pawl 17 is acted upon by said pins 16. When the pawl 17 is not in contact with the pins 16, it is held against the stop 33 by the spring 34, and at this time it has no effect on the ratchet 18. The hopper 5 may be of any suitable size, and tapers downward to its discharge-mouth 31, the lower front portion of the hopper being provided with a hinged door, 32, which may be opened, if desired, to permit an inspection of the agitator-cylinder 22.

In the foregoing part of this specification I have described the agitators for preventing the packing of the tobacco in the hopper 5 and feeding it into the discharge-mouth 31, together with the mechanism by which said agitators receive an intermittent motion from the main driving-shaft. The tobacco in successive charges is received from the discharge-mouth 31 by the receptacle 33, and is by it conveyed to the rolling-aprons (lettered 34 and 35, respectively) by which the "bunch" is formed.

I will first describe the receptacle 33 and the mechanism by which it is operated, and then the construction and operation of the mechanism for rolling the bunch. The receptacle 33 will preferably be of sheet metal, and is suspended in a pivotal manner between the front ends of the arms 36 and 37 by means of centering-screws 38. The rear ends of said arms are journaled in the upper ends of standards 39. The bottom of the receptacle 33 is in the form of an inclined door, 40, hinged at its rear edge, and is provided on its right-hand edge with a small roller, 41, which is in such position that, when the receptacle is beneath the discharge-mouth 31, as shown in Figs. 2 and 3, it will be in contact with the front edge of the vertical arm 42 projecting downward from the arm 37, the purpose of this contact of the roller 41 with the arm 42, when the receptacle 33 is in its elevated position, being to retain the door 40 closed. The roller 41 is held in contact with the arm 42 through the medium of the spring 43, one end of which is connected with the lower rear portion of the receptacle 33, while its other end is secured on the rod 44, connecting the rear ends of the arms 36 and 37. The spring 43 turns the lower portion of the receptacle 33 slightly rearward, and thus retains the pressure of the roller 41 against the arm 42, but when the tension of the spring is overcome, as shall be presently explained, the door 40 will be permitted to open by its own specific gravity and drop the contents of the receptacle upon the aprons 34 and 35. Upon the right-hand end of the receptacle 33 is provided a lug, 45, and below the arm 37 is pivoted to standard 39 an arm, 46, having upon its rear end, beyond the standard, a counterpoise, 47, and upon its front end the pocket or recess 48, the latter being in position to receive the said lug 45 during the downward movement of the receptacle 33, and arms 36 and 37, this downward movement being accomplished by the means and in the manner hereinafter described. The downward movement of the receptacle 33, acting through the lug or pin 45 and recess 48, operates to overcome the action of the counterpoise 47, and to cause the front portion of the arm 46 to move downward also. After the pin or lug 45 enters the pocket or recess 48, the arm 46 and receptacle 33 move downward together; but since the pivot of the arm 46 is below the pivot of the arms 36 and 37, carrying the receptacle, the arc in which the arm 46 travels is slightly forward of that of the arms 36 and 37, and hence during the said downward movement the pocket 48, carrying the lug or pin 45 in its arc, causes the lower part of the receptacle 33 to move or rotate slightly forward on its centering pins, 38, thus relieving the roll 41 from the pressure of the projecting arm 42, and permitting the door 40 to open and drop its contents as aforesaid. Upon the elevation of the arms 36 and 37, receptacle 33 and arm 46, the spring 43 retracts the lower portion of the receptacle to its former position, thus re-establishing the relation of the roll 41 and arm 42 to each other and closing the lid 40. The receptacle 33 is caused to move downward from below the discharge-mouth 31 to the aprons 34 and 35, and then upward again to its former position, by means of the arm 49, (see Fig. 2,) which has a fork, 50, on its upper end, inclosing the pin 51 on the arm 36, the said arm 49 being pivoted at its lower end to the plate 52 and being controlled as to its movement by the cam 53 on the shaft 10. The arm 49 carries a roll, which rests upon the cam 53, and permits the arm to lower by its own specific gravity when the depressed portion 53' of the cam is uppermost. (See Fig. 19.) The pin 51 on the arm 36 being inclosed by the fork 50, the said arm and the receptacle 33 will move with the arm 49. The receptacle 33 has within it two vertical transverse partitions 54 and 55, adapted to have a sliding movement from the center of the receptacle toward their respective ends, and to be adjusted at any desired points by means of the set-screws 56, which pass horizontally from lugs 57 on the partitions through the respective ends of the receptacle, as shown in Fig. 15. Upon the upper portions of the partitions 54 and 55 are the lips 58 and 59, which pass over and move upon the upper edges of the receptacle 33, and serve to guide and strengthen the partitions, and the latter of which lips, in connection with the scale 60 (see Fig. 1) on the front of the receptacle, serve to aid the operator in setting the partitions a definite distance apart, according to the quantity of tobacco it is desired to give to each bunch. By adjusting the partitions 54 and 55 nearer or farther from each other, the compartment formed between them will be varied as to size, and hence will hold a smaller or larger quantity of tobacco, according to the wish of the manufacturer and the character of cigar to be produced.

In order to prevent any escape of tobacco from the contracted discharge-mouth 31 of the hopper 5 while the receptacle 33 is in its depressed position, a valve-plate, 61, is provided to close said mouth when the receptacle 33 is down, and to open the same when said receptacle is up. The plate 61 is secured on a screw, 62, and is connected at its outer end with one end of a chain or cord, 63, which passes from said end of the plate 61 over pulleys 64, (see Figs. 2 and 8,) and thence to the rear end of the rocking arm or lever 65, which is pivoted to the plate 52 and the front end or portion of which is in contact with and is raised and lowered by the cam 53. When the front end or portion of the lever 65 is moved upward, the rear end thereof will be depressed and will draw the chain 63 and thus cause the plate 61 to swing from under the discharge-mouth 31. During the contrary movement of the said lever 65 the plate 61 is closed under said mouth 31 by means of the spring 66.

The main driving-shaft 6 is in two parts, the division being at the ordinary form of clutch, 66', (see Fig. 1,) and said parts have a simultaneous movement when the two halves of said clutch engage each other. When said halves of the clutch do not engage each other, the right-hand part of the driving-shaft may freely rotate, while the left-hand part thereof and its connecting mechanism are at rest. The halves of the clutch 66' are caused to come into engagement with each other or be relieved therefrom by means of the cam 67 on shaft 10, actuating the lever 68, which is pivoted in rigid lugs at its lower end, and about its central portion is firmly secured to the sliding half of the clutch 66'. Upon the surface of the cam 67 there are in succession a long depression, 69, a short elevation, 70, a short depression, 71, and a long elevation, 72, (see Figs. 1 and 20,) and while the upper end of the arm 68 is in contact with the said elevated surfaces 70 and 72 of said cam, the halves of the clutch 66' will be disengaged from each other, and the left-hand portion of the driving-shaft 6 will consequently be at rest, and during the time the upper end of the arm 68 is moving in the said depressions 69 and 71 the halves of said clutch 66' will engage each other, and hence at such time the left-hand part of the driving-shaft will have a simultaneous motion with that part thereof on the right of the clutch 66'. Owing to the clutch 66' the mechanism connected with the driving-shaft 6 between the standards 3 4 may remain idle, while the shaft 10 and the feeding mechanism are in full operation, and the purpose of this arrangement will be understood from the description of the operation of the machine hereinafter presented.

The rolling-aprons 34 and 35 are next to be described, and these are clearly shown in Figs. 1, 4, 5, and 16. The apron 34 passes over rollers 73, 74, and 75, the rollers 73 and 75 being mounted in a stationary frame, and the roller 74 being mounted in a pivotally-secured frame, 76, whereby it may be lowered from the position shown in Fig. 5, to that shown in Fig. 16, and thus loosen the apron 34, as indicated in Fig. 16. Beneath the front portion of the apron 34, is provided a roller, 77, mounted in the upper end of a pivotally-secured arm, 78, the upper end of which has a spring-tension upward, whereby the apron when traveling is kept taut. The apron 35 moves upon rollers 79, 80, and 81, the first-mentioned roller being secured in a tilting-frame, 82, which has a spring-tension upward at its rear end, and carries in its front end the rubber pressure-roller 83, which is either in a depressed or elevated position, according to whether the rear end of frame 82 is elevated by the spring 84 or depressed by the cam 85 on shaft 10. The two positions of the roller 83 are shown in Figs. 5 and 16, respectively. The frame 76, carrying the roller 74 beneath the apron 34, receives its upward and downward movement, whereby said roller is caused to either tighten or loosen the apron, from the cam $q$ on the left-hand end of shaft 10 through the medium of the vertical rod 85', whose upper end is acted upon by the groove of the cam and whose lower end is connected by a pin with said frame 76. During the revolution of the cam $q$ the rod 85' either raises or lowers the frame 76 and roller 74, as hereinafter described. The rollers carrying the aprons derive their motion from the driving-shaft through the chains of gear-wheels 86 and 87, respectively, (the former being shown more clearly in Fig. 9,) and these rollers and their gearing, together with the aprons 34 and 35, cam $q$, rod 85', frame 76, and arm 78, being shown and described in Letters Patent of the United States No. 214,015, and issued to me April 8, 1879, are not claimed herein, and hence a more particular description of these parts is probably unnecessary, except in the particulars in which they are referred to hereinafter.

In the operation of the machine the loose tobacco for the bunches is placed in the hopper 5, and power applied to the band-wheels 6', the effect being that the agitator-shafts within the hopper 5 will have an intermittent motion and the shaft 10, with the cams secured thereon, a continuous motion, while the portion of the shaft 6 at the left of the clutch 66', together with the rollers carrying the aprons 34 and 35, will rotate during the times the upper contact end of the arm 68 is in the depressions 69 and 71 of the cam 67, and will remain at rest when said contact end of said arm 68 is on the elevations 70 and 72 of said cam 67. The cam $q$ is timed with the cam 67, so that it may loosen the apron 34 while the upper contact end of the arm 68 is in the depressions 69 and 71 of said cam 67. For purposes of description it may be assumed that the condition of the machine is such that the upper end of arm 68 is starting along the elevation 72 of cam 67. At this time the cam $q$ lowers roller 74, loosening the apron 34, the cam 85 depresses the rear end of frame 82 and elevates the pressure-roller 83, and the cam 53, operating through the arm 65 and chain or cord 63, opens the valve 61, allowing a charge of the tobacco to fall into the receptacle 33. The purpose of loosening the apron 34 and elevating the roller 83 at the time just above specified is to prepare the roller mechanism to receive the charge of tobacco falling at the time into the receptacle 33. While the upper contact end of the arm 68 continues to travel along the elevation 72 of cam 67, the cam 53, operating through arm 65, closes the valve 61 and, through arm 49, lowers the receptacle 33, during the downward movement of which the arm 46 opens the door 40 and allows the charge of tobacco to fall from the receptacle 33 upon the inner portion of the apron 34. At this stage of the operation the receptacle 33 returns to its former position, the cam $q$ tightens the apron 34 by raising roller 74, the cam 85 permits the depression of roller 83, and the upper contact end of arm 68 passes into the short depression, 71, of the cam 67, and the halves of the clutch 66' engage each other, causing the left-hand part of shaft 6 and the rollers carrying the aprons 34 and 35 to revolve. This motion of the left-hand part of shaft 6, and the rollers carrying the aprons 34 and 35, continues while the upper contact end of arm 68 is in the short depression 71, and during this time the aprons 34 and 35 roll the charge of tobacco deposited upon them. As the upper end of arm 68 passes upon the short elevation 70 of cam 67 from the short depression 71, the parts of clutch 66' again separate, the rolling-aprons 34 and 35 become motionless, the roller 83 is slightly elevated and roller 74 slightly depressed, loosening apron 34, and at this time the attendant should pass the edge of the binder-leaf along said apron 34 and below the edge of the charge of tobacco, whereupon the upper end of arm 68 will descend from the short elevation 70 into the long depression 69 of the cam 67, the halves of clutch 66' engage each other, the roller 74 ascends, the roller 83 lowers, and the aprons 34 and 35 will travel on their respective rollers and form the bunch. The rolling of the bunch continues while the upper end of arm 68 is in contact with the long depression 69 of cam 67, and as soon as the said end of arm 68 starts up the long elevation 72 from said short depression, the aprons 34 and 35 again become motionless, the roller 74 lowers and roller 83 ascends, at which time the bunch may be removed by the hand of the attendant. While the bunch is being rolled the valve 61 is opened and another charge of tobacco allowed to fall into the receptacle 33, which, during the contact of the end of arm 68 with the long elevation 72, descends upon the apron 34 in the manner above described.

In the foregoing description of the operation of the machine I have explained the formation of one bunch and the depositing of a charge of tobacco on the apron 34, preparatory to the forming of a second bunch. A complete bunch is rolled during each revolution of the shaft 10, and a charge of tobacco is dropped into the receptacle 33 for a second bunch. The foregoing operation is continued until the tobacco in the hopper 5 has been consumed, whereupon an additional supply will be introduced into the hopper and the operation of forming bunches resumed.

What I claim as my invention, and desire to secure by Letters Patent, is—

1. In a cigar-making machine, the hopper to contain the filler-tobacco, and a rotating agitator in said hopper, combined with the ratchet 18, pawl 17, wheel 11, having the series of pins 16, arranged to come in contact with the lower end of pawl 17, and intermediate mechanism between the said agitator and said ratchet, and intermediate mechanism between wheel 11 and the driving-shaft 6, whereby the agitator may receive motion from the said driving-shaft, substantially as and for the purposes set forth.

2. In a cigar-making machine, the hopper 5, having the discharge-mouth 31 at its lower end, combined with the pivoted valve-plate 61, the tilting arm 65, the chain or cord 63 passing from one end of plate 61 to arm 65, the spring 66 for retracting said plate 61 after it has been moved by the chain or cord, and a cam for actuating the arm 65, substantially as set forth.

3. In a cigar-making machine, the hopper 5 and rolling-aprons for forming the bunch, combined with the conveying-receptacle 33, having hinged door 40 and pin 45, the oscillating arms 36 and 37, carrying said receptacle between them, the arm 46, pivoted below the arms 36 and 37, and having a pocket, 48, the arm 42, the roll or stud 41 on the door 40, and means, substantially as described, for moving the receptacle between the discharge-mouth of the hopper to the rolling-aprons, substantially as and for the purposes described.

4. In a cigar-making machine, the hopper and rolling-aprons for forming the bunch, combined with the conveying-receptacle 33, having the hinged door 40 on its bottom, and pin 45 on its end, the oscillating arms 36 and 37, carrying the said receptacle between them, the oscillating arm 46, mounted below arms 36 and 37, and having a pocket, 48, on its front end, and a weight, 47, on its rear end, and the arm 42, projecting from the arm 37, substantially as and for the purpose set forth.

5. In a cigar-making machine, the hopper and rolling-aprons for forming the bunch, combined with the conveying-receptacle 33, having the hinged door 40 on its bottom and pin 45 on its end, the oscillating arms 36 and 37, carrying the receptacle 33 between them, the oscillating arm 46, mounted below arms 36 and 37, and having a weight, 47, on its rear end and a pocket, 48, on its front end, the arm 42 on arm 37, the pin 51 on arm 36, the rocking arm 49, having a forked upper end inclosing the pin 51, and the cam 53 for said arm 49, and mounted on shaft 10, substantially as and for the purposes set forth.

6. In a cigar-making machine, the combination of the hopper for holding the loose filler-tobacco, aprons located below said hopper for rolling the bunch, the conveying-receptacle 33, and mechanism for moving the receptacle between the hopper and aprons, said receptacle having adjustable partitions 54 and 55, and an indicating-scale to guide the attendant in setting said partitions, substantially as and for the purpose set forth.

7. In a cigar-making machine, the combination of the hopper for holding the loose filler-tobacco, aprons located below said hopper for rolling the bunch, the conveying-receptacle 33, open at its top, and having a hinged door, 40, mechanism for moving the receptacle in a substantially upright position between the hopper and aprons, and mechanism for opening said door 40 when the receptacle is in its lower position, substantially as and for the purposes set forth.

8. In a cigar-making machine, the combination of the hopper for holding the loose filler-tobacco, aprons located below said hopper for rolling the bunch, the conveying-receptacle 33, and mechanism for moving the receptacle between the hopper and aprons, said receptacle having adjustable partitions 54 and 55, substantially as and for the purposes described.

9. In a cigar-making machine, the combination of the hopper 5, conveying-receptacle 33, mechanism for raising and lowering the said receptacle, aprons 34 and 35, mounted, respectively, on the sets of rollers 73, 74, and 75, and 79, 80, and 81, the driving-shaft 6, having clutch 66', the arm 68, the shaft 10, and the cam 67, having depressions 69 71, and elevations 70 and 72, whereby the shaft 10 may rotate and actuate the feed mechanism and receptacle 33, while the aprons 34 and 35 are at rest, substantially as and for the purposes described.

10. In a cigar-making machine, the combination of the hopper, shafts 21 and 29, carrying radial pins 23 and 30, respectively, within the hopper, mechanism, substantially as described, for giving the shafts an intermittent motion, rolling-aprons 34 and 35, having an intermittent motion, a conveying-receptacle, 33, mechanism for raising and lowering said receptacle, the driving-shaft having clutch 66', a cam, 67, for operating said clutch, and a chain of gearing passing from said driving-shaft on the right of said clutch to the agitator cylinders or shafts 21 and 29, substantially as and for the purposes set forth.

11. In a cigar-making machine, the hopper having the discharge-mouth 31 at its lower end, the pivoted valve-plate 61, and mechanism for actuating said plate, in combination with the measuring-receptacle 33, of definite proportions, adapted to measure the tobacco for each cigar, aprons for rolling the tobacco, and mechanism for moving the said receptacle between the hopper and the aprons, substantially as and for the purposes described.

Signed at New York, in the county of New York and State of New York, this 20th day of March, A. D. 1886.

JOHN R. WILLIAMS.

Witnesses:
CHAS. C. GILL,
EDWARD WOLFF.